C. S. FOLSOM.
WATER HEATER.
APPLICATION FILED NOV. 9, 1911.

1,062,574.

Patented May 20, 1913.

3 SHEETS—SHEET 1.

Witnesses:
Geo. J. Huting.
Elmer E. Rodabaugh.

Inventor:
Charles S. Folsom.
A. B. Bowman
Atty

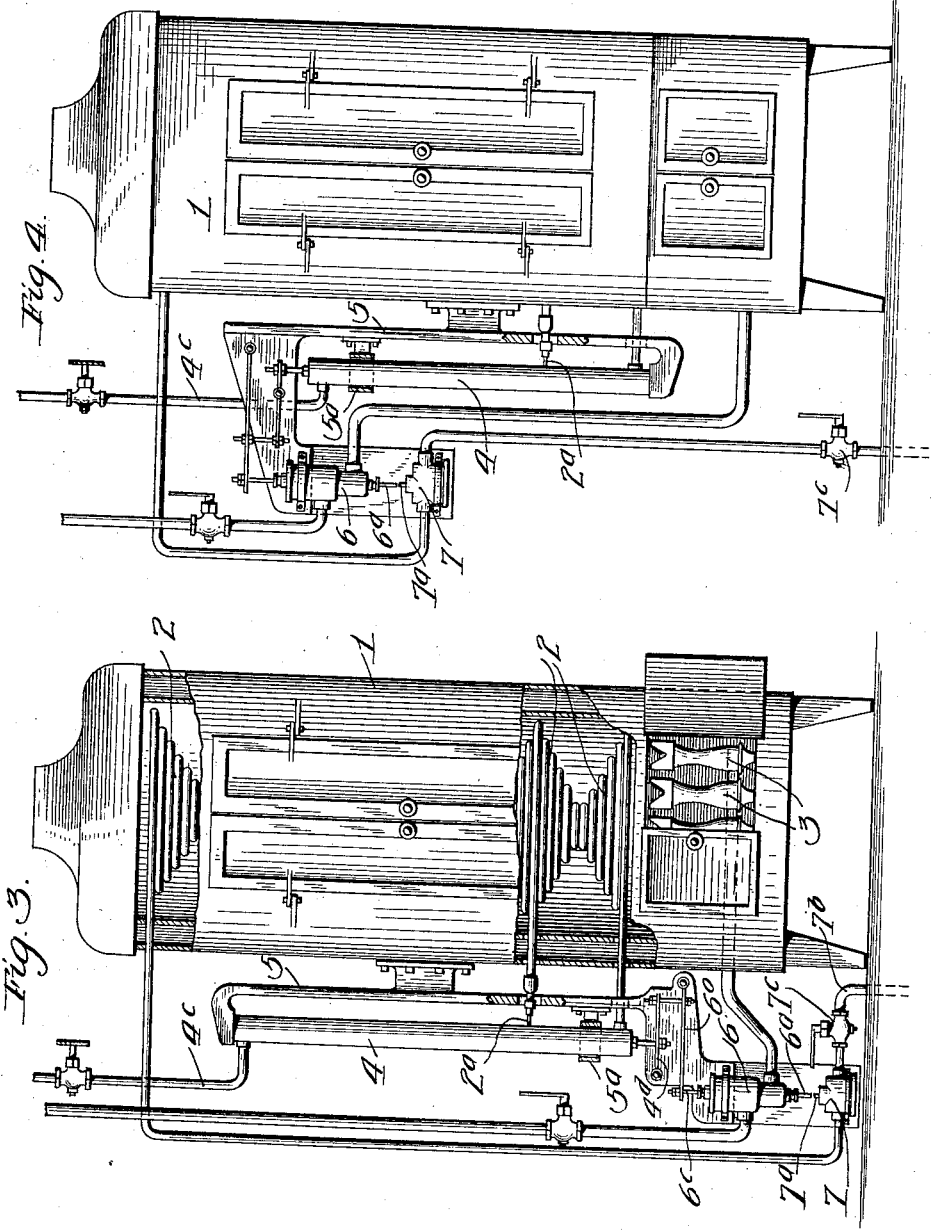

UNITED STATES PATENT OFFICE.

CHARLES S. FOLSOM, OF SAN DIEGO, CALIFORNIA.

WATER-HEATER.

1,062,574.        Specification of Letters Patent.        Patented May 20, 1913.

Application filed November 9, 1911. Serial No. 659,351.

*To all whom it may concern:*

Be it known that I, CHARLES S. FOLSOM, a citizen of the United States, and a resident of San Diego, in the county of San Diego and State of California, have invented certain new and useful Improvements in Water-Heaters, of which the following is a specification.

My invention relates to improvements in water heaters in which the fuel supply for heating the water is automatically regulated by the temperature of the heated water, and the objects of my invention are, first, to provide a very simple and efficient means for regulating the heat relatively to the temperature of the water, second, to provide a safe, simple, economically constructed water heater, third, to provide a novel and substantial means of connecting said regulator or a thermostate to a water heating receptacle, fourth, to provide a novel thermostatic and water regulated gas valve for regulating the flow of gas to the burners, fifth, to provide means in said water heater to allow circulation of the heated water therein, after the service pipe is closed.

With these and other objects in view as will appear, my invention consists of certain novel features of construction, combination and arrangement of parts, as will be hereinafter described in detail and particularly set forth in the appended claims, reference being had to the accompanying drawings, and to the characters of reference thereon which form a part of this specification, in which:—

Figure 1:
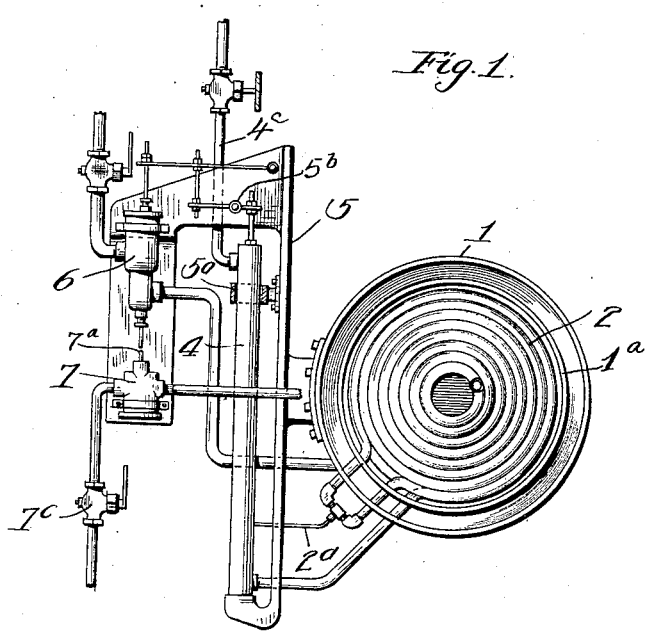
Figure 2:
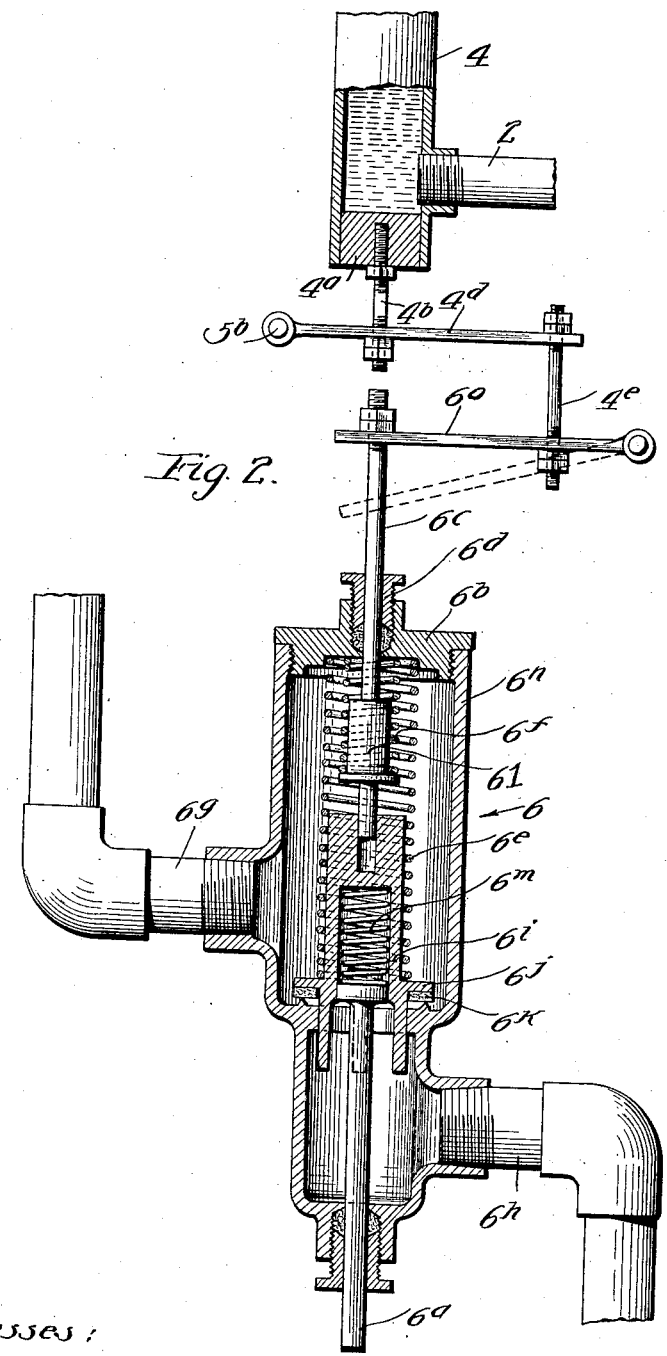

Figure 1 is a plan view of the heater proper with the regulating apparatus shown in horizontal position for the purpose of better illustration. Fig. 2, is a detail sectional view on an enlarged scale of a portion of my thermostat and gas valve, shown in operative connection, Fig. 3 is a side elevational view showing parts broken away and in section and showing a modified application of my regulating device in connection with a water heater receptacle, Fig. 4 is a similar view showing the application of said regulator or thermostat in a slightly modified form from that of Fig. 3.

Similar characters of reference refer to similar parts throughout the several views.

My water heater consists of a receptacle 1, multiple coil 2, burner 3, thermostat 4, thermostat connection 5, gas valve 6, and water valve 7.

The receptacle 1 is cylindrically shaped and provided with an inner lining $1^a$ spaced apart therefrom. In the lower portion of this receptacle is provided a compartment for burners 3, preferably gas burners. Immediately above these burners is provided a plurality of multiple coil pipe 2, shaped as shown best in Fig. 3, and having an inlet at its top connecting with a water valve 7, and an outlet at its lower end connecting with a thermostat 4 and another very small outlet $2^a$ at the top of the lower section of said coil. It will be here noted that this multiple pipe coil is so constructed as to provide a natural drainage from the top, and also is in sections converging and diverging to provide a large heating surface. The large outlet from coil 2 connects with the thermostat 4 near its one end. This thermostat 4 is a single pipe of suitable diameter and length, which is rigidly attached at its one end to support 5, and support 5 is rigidly attached to the receptacle 1, at a suitable place. Rigidly connected to support 5 is a guide $5^a$, in which pipe 4 is loosely mounted. In the other end of pipe 4 is provided a plug $4^a$ into which is screwed an adjusting screw $4^b$. Connecting with the inner surface of pipe 4 is an outlet pipe $4^c$ which is ordinarily a service pipe. In connection with the adjusting screw $4^b$ is lever $4^d$ which is pivotally mounted at its one end on support 5 at point $5^b$ and having its other end extended past said adjusting screw. Connecting with the extended end of said lever $4^d$ by means of connecting bolt $4^e$ is another lever $6^o$, which is pivotally mounted on support 5 at its one end and having its other end extending some distance as shown best in Fig. 2. However, the details of the lever construction will vary, to suit the various applications, to which this regulator or thermostat may be applied as will be seen in Figs. 1, 3, and 4. The extended end of the lever $6^o$ connects with the valve stem $6^c$ of the valve 6, which regulates the flow of gas to the burners 3. This gas valve 6 is composed of an outer casing $6^n$ provided with a plug $6^b$ which is provided with a central hole adapted for rod $6^c$. This plug $6^b$ is provided centrally with a stuffing box $6^d$ adapted to close the joint around rod $6^c$. Near the inner end of rod $6^c$ is gland 61, which is provided with a compression spring $6^f$. This valve is also provided with a lateral inlet $6^g$, and a lateral out-let $6^h$. Between the inlet and the outlet there is provided a valve seat. Connecting with said valve seat is a valve gland 6¹ which is provided with a flange 6ʲ. This flange 6ʲ is adapted to support the valve face 6ᵏ. In one end of this valve gland is provided a recess adapted for the end of the rod 6ᶜ, so that the gland 6¹ may be moved back and forth without engaging with the rod 6ᶜ under certain conditions. On the outer surface of the gland 6¹ is provided a spring 6ᵉ which is adapted to close the valve at all times except when the spring is compressed. Inside of said gland 6¹ is an inner compression spring 6ᵐ, which engages with the inner end of valve stem 6ᵃ. This spring 6ᵐ is of a sufficient strength when the rod 6ᵃ is pressed in to compress the spring 6ᵉ and open the valve when the rod 6ᶜ is not against the bottom of the recess in the gland 6¹, but it will be compressed when the rod 6ᶜ is thrust fully into said recess by means of the thermostat levers.

It will be here noted that the spring 6ᶠ is enough stronger than spring 6ᵐ to close the valve when the rods 6ᵃ and 6ᶜ are pressed in, thus providing a spring actuated valve with one seat, only, adapted to be operated both thermostatically and by water pressure. It will also be noted that the higher the temperature of the water entering pipe 4 from the coils 2, the greater will be the expansion and elongation of pipe 4, which in turn will operate levers 4ᵈ, and 6°, thus automatically regulating the gas flow through the valve 6, thus regulating the heat from the burners 3, and vice-versa. In this water heater construction, the gas valve 6 and water valve 7 are set opposite and adjacent to each other. In operative connection with valve 7 is a valve stem 7ᵃ adapted to engage with a similar valve stem 6ᵃ, in the gas valve 6, so that when the water is turned on through valve 7 from the pipe 7ᵇ which is regulated by valve 7ᶜ, the flow of the water through valve 7 will cause the valve stem 7ᵃ to engage with valve stem 6ᵃ, thereby opening gas valve 6.

Though I have shown and described a particular construction, of a thermostat and a valve for the regulation of water heaters, I do not wish to be limited to this particular construction, but desire to include in my invention, the construction substantially as set forth in the appended claims.

Having thus described my invention, what I claim as new and desire to secure by Letters Patent is:—

1. In a water heater, the combination of a multiple coil, provided with one inlet near its top, and two outlets near its bottom, a thermostat consisting of a single pipe in operative connection near its one end, with both of said outlets, said thermostat serving as a portion of the service pipe, a single valve provided with three inclosed springs regulated by means of said thermostat, a water valve for actuating said valve, and a single piece means for rigidly connecting said valves and the water heater, attached to the side of said water heater.

2. In a water heater, the combination with a multiple coil, provided with two outlets, of a thermostat consisting of a single pipe connected near its one end with both outlets of said coil, a water valve, and a single piece casting means in connection therewith for rigidly supporting said thermostat at one of its ends, and a single valve provided with three inclosed springs regulated by means of said thermostat and actuated by said water valve.

3. In a water heater, the combination of a multiple coil, provided with two outlets near its lower end and an inlet at its upper end, a water-actuated valve, a one piece thermostat connected near its lower end with both of said outlets, a doubly actuated valve provided with three inclosed regulating springs in connection with said thermostat, one of its actuations being adapted to be produced by the temperature of the water in said thermostat and the other by the action of said water-actuated valve.

4. In a water heater, the combination with a thermostat composed of a single piece of pipe used also as a portion of the service pipe, of a multiple coil water receptacle divided into sections, a connection with a small opening from the lower end of the upper section to the thermostat near its lower end, a connection with a small opening from the upper end of the lower section to near the lower end of the thermostat, a large outlet from the lower end of the lower section and passing through said thermostat, an inlet connecting with the upper end of the upper section thereof, a gas valve provided with three inclosed springs, adapted to facilitate the actuation of said valve, and a single piece casting attached to the water heater and adapted to connect the one end of said thermostat and said gas valve rigidly.

5. The combination with a thermostat composed of a single pipe used also as a portion of the service pipe, of a water-actuated valve, a multiple coil water receptacle provided with an inlet to the upper portion and two outlets from the lower portion, both of said outlets being connected, one above the other, to said thermostat near the lower end, and the upper one of said outlets being so arranged that the water will circulate in said water receptacle between the two outlets when the outlet from the thermostat or service pipe is closed, and a single valve provided with three inclosed springs regulated by means of said thermostat and actuated by said water-actuated valve.

6. In a water heater the combination of a thermostat consisting of a single pipe provided with two inlets near its one end and one outlet near its other end, a water-actuated valve, a gas valve comprising a casing, inlet and outlet means in said casing, a valve seat between said inlet and outlet means, a spring adapted to close said valve, another spring in said casing adapted to compress said first mentioned spring, and a third spring in said casing adapted to operate in connection with said first mentioned spring, said second and last mentioned springs being regulated by said thermostat and said water-actuated valve.

7. In a water heater, a gas valve comprising a casing, inlet and outlet means in said casing, a valve seat between said inlet and outlet means, a valve in said casing adapted to close against said seat, a spring in said casing adapted to close said valve, another spring in said casing adapted to compress said first mentioned spring, and a third spring in said casing adapted to operate in connection with said first mentioned spring to compress said second mentioned spring, a one piece thermostat, a heating receptacle provided with two outlets near the one end connecting with the one end of said thermostat, and inlet means near its other end connecting with its other end, and lever and bolt means in connection with said thermostat for opening said valve.

8. In a water heater, a water heater receptacle, a water heating receptacle therein, a gas valve comprising a casing, said casing being formed with inlet and outlet means, a valve seat between said inlet and outlet means, a valve in said casing adapted to close against said seat, a spring in said casing adapted to close said valve, another spring in said casing adapted to compress said first mentioned spring and a third spring in said casing adapted to operate in connection with said first mentioned spring to compress said second mentioned spring, a thermostat consisting of a single pipe provided with an inlet at one end and two outlets near the other end, and a bracket means attached to said water heater receptacle for rigidly connecting said thermostat and valves.

9. In a water heater, the combination of a water receptacle formed with an inlet and two outlets, a burner for heating the same, means for conducting fuel to said burner, a single pipe thermostat, a water-actuated valve, a gas valve comprising a casing, inlet and outlet means in said casing, a valve seat between said inlet and outlet means, a valve in said casing adapted to close against said seat, a spring in said casing adapted to close said valve, another spring in said casing adapted to compress said first mentioned spring, and a third spring in said casing adapted to operate in connection with said first mentioned spring to compress said second mentioned spring, said second and last mentioned springs being regulated by said water-actuated valve and said thermostat, respectively, in connection with the ends of said casing, and a single casting attached rigidly to said water heater, to said thermostat, to said water-actuated valve, and to said gas valve.

10. In a water heater, the combination of a water heating receptacle having an inlet and an outlet and another very small inlet or outlet, a burner for heating the same, means for conducting fuel to said burner, a gas valve comprising a casing, inlet and outlet means in said casing, a valve seat between said inlet and outlet means, a valve in said casing adapted to close against said seat, a thermostat consisting of a single pipe, and a single casting means attached centrally to said water heater and attached to said thermostat and valve for rigidly connecting said thermostat, valve and receptacle.

11. In combination with water heaters, a multiple coil, a thermostat consisting of a single piece of pipe adapted for the passage of water in connection therewith, a support attached centrally to said water heater adapted to rigidly connect said thermostat and a gas valve, said gas valve comprising a casing, inlet and outlet means in said casing, a valve seat between said inlet and outlet, a valve in said casing adapted to close against said seat, a spring in said casing adapted to close said valve, another spring in said casing adapted to compress said first mentioned spring and a third spring in said casing adapted to operate in connection with said first mentioned spring to compress said second mentioned spring, and a plurality of levers operatively connecting said thermostat and said gas valve.

In testimony whereof, I have hereunto subscribed my name in the presence of two subscribing witnesses.

CHARLES S. FOLSOM.

Witnesses:
ELMER E. RODABAUGH,
ABRAM B. BOWMAN.

---

Copies of this patent may be obtained for five cents each, by addressing the "Commissioner of Patents, Washington, D. C."